Inventor
J. Rex Davis
By
Eccleston & Eccleston.
Attorneys

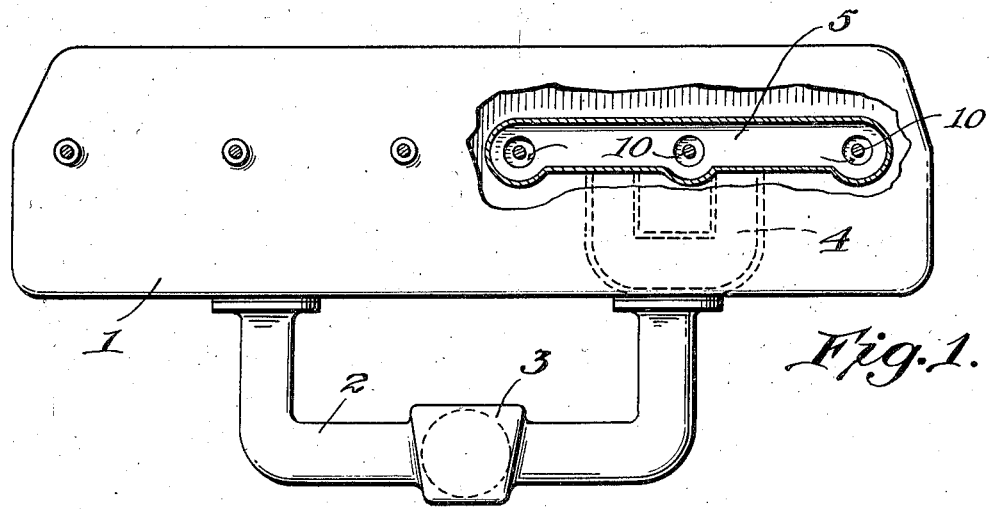
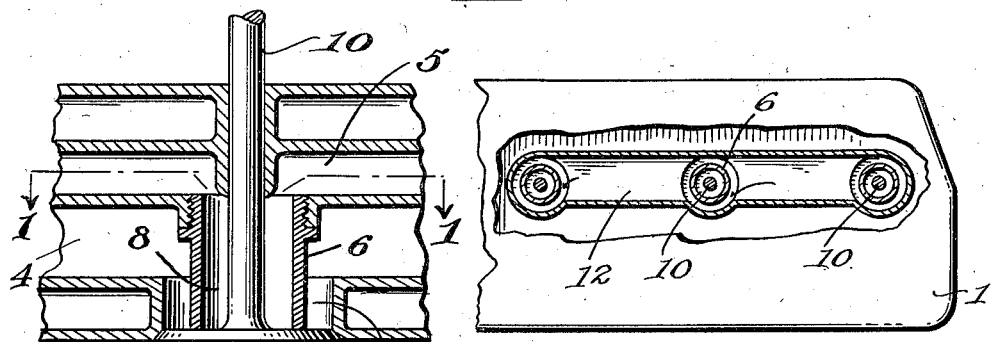
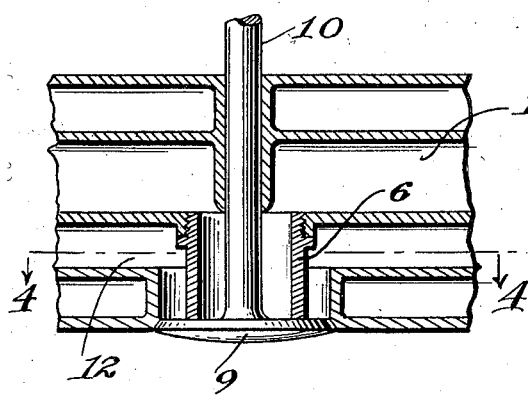

Patented Jan. 19, 1937

2,068,311

UNITED STATES PATENT OFFICE 2,068,311

METHOD AND APPARATUS FOR INTRODUCING EXPLOSIVE CHARGES INTO INTERNAL COMBUSTION ENGINES

Joseph Rex Davis, Clarksburg, W. Va.

Application May 19, 1930, Serial No. 453,779

13 Claims. (Cl. 123—52)

This invention relates to internal combustion engines and has for its primary object to provide a method for introducting the explosive charge into the cylinder so as to more completely fill the cylinder with gas on the induction stroke and thereby greatly improve the performance of the engine as to power, acceleration, etc.

A further object of the invention consists in providing for a slower idling speed for the engine.

Another object of the invention resides in a structure for carrying out the method which is so simple in design as to permit its embodiment in the ordinary internal combustion engines without appreciable increase in cost.

In my copending application Serial No. 376,213, filed July 5, 1929, for Internal combustion engine, I have disclosed a somewhat similar construction and method in which a preliminary charge of air is admitted to the engine cylinder. In this earlier application a valve is provided for timing the admission of auxiliary air to the admission manifold and cylinder and is capable of being moved to a position for entirely shutting off the admission of air, and is thus capable of operation in a manner similar to the apparatus and method to be described herein.

In the conventional internal combustion engine the amount of explosive mixture entering a cylinder varies in accordance with the size of the cylinder, the speed of travel of the piston, and the cross sectional area of the intake manifold. However, the cross sectional area of the intake manifold is limited by reason of the fact that above a certain dimension the velocity of the gases is reduced to such an extent as to cause a partial condensation of the fuel. By the construction to be described the method of introducing the explosive charge into the cylinder is so modified as to cause a substantially larger amount of such charge to enter the cylinder during any induction stroke without increase in the size of the manifold, and thus the attendant advantages such as increased power at constant speed and during acceleration, etc., are provided without increase in the size of the engine and without appreciable increase in construction costs of the engine.

In the drawings:

Figure 1 is a plan view of an internal combustion engine embodying the new principle of operation, partly in section taken on the line 1—1 of Figure 2.

Figure 2 is a fragmentary vertical sectional view through a cylinder head showing one of the admission valves in its relation to the intake manifold and the chamber or pocket which functions to carry out the steps of the novel method of introducing gases.

Figure 3 is a view similar to Figure 2 showing a slightly modified construction in which the intake manifold is above the chamber or pocket which cooperates therewith.

Figure 4 is a fragmentary horizontal sectional view taken on line 4—4 of Figure 3.

Figure 5:
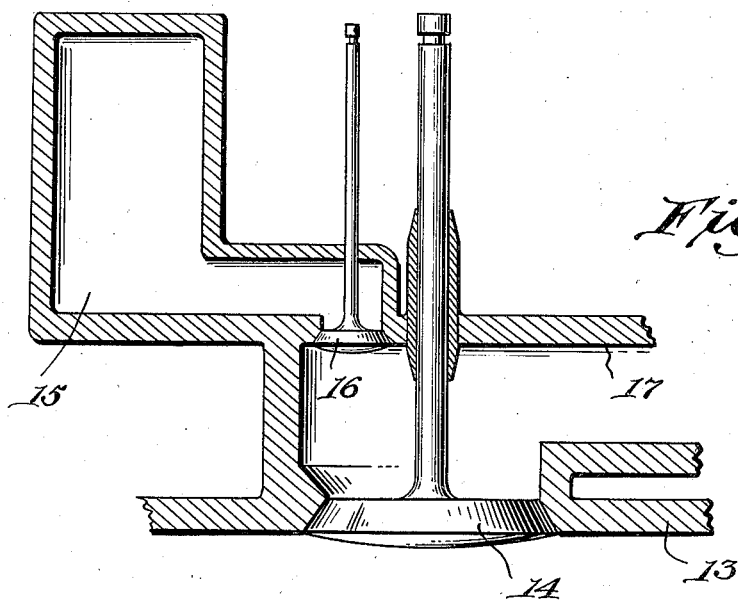
Figure 5 is a vertical sectional view through the admission valve and chamber or pocket for a cylinder providing a modified construction in which a separate valve is employed for controlling communication between the chamber or pocket and intake manifold.

Referring to the drawings in more detail and especially to Figures 1 and 2 thereof, the numeral 1 indicates a six cylinder internal combustion engine provided with an intake manifold 2 and carburetor 3. An intake manifold 4 is formed in the cylinder head of the engine and constitutes an extension of the intake manifold 2 leading to the interior of the cylinder.

Disposed above the manifold 4 is a chamber or cavity 5 which constitutes a very essential feature of the present invention. Extending from the chamber 5 is a pipe 6 which has its lower end concentrically arranged in an opening formed in the cylinder head for communication with the interior of the cylinder. This pipe is of less diameter than the opening into the cylinder, and it will be apparent, therefore, that two passageways 7 and 8 are provided, the former for the admission of gas to the cylinder and the latter for affording communication between the chamber, manifold and cylinder. It will be understood that there is a pipe 6 for each of the cylinders connected with the particular manifold 4.

Intake valves 9 provided with operating stems 10 of conventional construction are provided for each cylinder in the usual way. Each of these valves is ground so as to provide seating faces adapted to cooperate with the ground seats formed on the lower end of its pipe 6 and the wall surrounding the admission port. The chamber 5, it will be seen, is of sufficient length to communicate with three cylinders, but it will be apparent that a separate chamber for each cylinder may be provided if desired.

When the valve 9 is open it will be apparent that a passageway is provided which is common to both passageways 7 and 8 above described.

I will now describe the manner in which the pocket 5 functions to cause a greater flow of explosive mixture to the cylinder during acceleration and the production of maximum power than can be provided in the conventional internal combustion engine having cylinder and intake manifold of the same dimensions.

As the piston completes its induction stroke or slightly before or after the induction stroke is completed, depending upon the timing of the admission valves, the valve 9 closes and in so doing traps in the chamber 5 a partial vacuum, which, of course, is also present in the passageway 7 at the completion of the induction stroke. It will be understood, however, that since the manifold and passageway are in communication with the carbureter the negative pressure in the manifold will approach atmospheric pressure between the closing and opening of the valve 9; whereas the negative pressure trapped in chamber 5 will remain fixed until such time as the valve again opens. When the valve 9 opens communication is provided between the intake manifold 4 and the chamber 5 and, due to the negative pressure in the chamber 5, a flow of gases is immediately started from the manifold into the chamber. This flow of gases is therefore started earlier than would be the case in the conventional internal combustion engine, inasmuch as the initial downward movement of the piston on its induction stroke does not create sufficient vacuum in the cylinder to overcome the resistance to the flow of gases in the manifold 4. However, as the piston moves further along on its downward stroke the suction created is sufficient to divert the flow of gases from the chamber to the cylinder. With further movement of the piston the gases which have previously entered the chamber will also be drawn into the cylinder. It is apparent, therefore, that the explosive gases enter the cylinder much more rapidly than in the ordinary type of internal combustion engine in which there is no chamber as disclosed in the present construction. As the piston completes its induction stroke and the valve 9 closes, communication is again shut off between the intake manifold 4 and the chamber 5, and the low pressures which are created in the manifold 4 by the induction stroke of the piston are again trapped in the chamber 5 so as to again initiate a flow of gases from the manifold 4 to the chamber 5 as the valve again opens for the next induction stroke.

By means of this construction and operation it will be apparent that the value of the chamber 5 is twofold, namely to initiate a flow of gases in the manifold 4 toward the cylinder earlier than can be done by the mere downward movement of the piston in the early stages of its movement, and also to provide an extra supply of gas in the chamber 5 which is also drawn into the cylinder as the piston proceeds further on its induction stroke. These operations provide for improved acceleration and increased power in the engine. Moreover, the employment of the chamber 5 also serves to decrease the variation of pressures in the manifold during the induction stroke and thereby permits of a very slow idling speed of the engine.

In the modified construction of the invention shown in Figures 3 and 4, the intake manifold is indicated by the numeral 11 and is located above the chamber 12 so that the explosive charge passes into the cylinder through the pipe 6 rather than on the outside thereof as indicated in Figures 1 and 2. This is the preferred arrangement of the apparatus inasmuch as any heated gases leaving the cylinder through the intake valve 9 will pass into the chamber 12 rather than into the intake manifold 11, thus avoiding liability of premature ignition by the hot gases escaping from the cylinder.

In Figure 5 is shown more or less diagrammatically a cylinder 13 provided with an intake valve 14, a chamber 15, and an auxiliary valve 16 for controlling communication between the chamber 15 and the intake manifold 17. The operation of this construction is identical with that heretofore described, except that by reason of the auxiliary valve 16 the time of establishing and the duration of communication between the chamber 15 and intake manifold 17 may be varied independently of the opening of the valve 14 which establishes communication between the intake manifold 17 and the cylinder. This construction, while adding somewhat to the cost of the engine, may be desirable under certain conditions, inasmuch as it is sometimes of advantage to permit communication between the chamber and intake manifold prior to the opening of the intake valve, and also to shut off communication earlier or later than at the time of closing of the intake valve.

Figure 6:
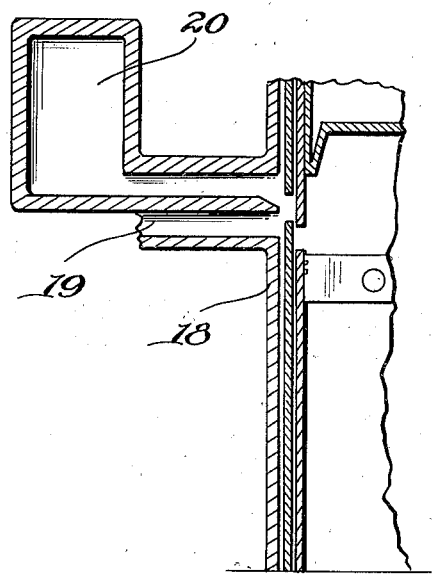
Figure 6 is a similar view of the novel construction as applied to a sleeve valve engine.

In Figure 6 is shown a sleeve valve cylinder indicated generally by the numeral 18 and provided with an intake manifold 19 and chamber 20. This construction serves to increase the charge of gas entering the cylinder by reason of the fact that a preliminary charge will enter the chamber 20 prior to the induction stroke of the piston as in the previously described forms, but due to the peculiar operation of the sleeve valve engine the initiation of a flow of gases in the manifold toward the cylinder is not so pronounced as in the poppet valve type of engine.

From the foregoing description taken in connection with the accompanying drawings it will be apparent to those skilled in the art that I have devised an exceedingly simple construction or modification of the ordinary internal combustion engine, by means of which a larger charge of explosive mixture is caused to enter the cylinders without increasing the dimensions of the intake manifold; that this increase in the charge is due not only to the fact that the initiation of the flow of gases in the manifold is begun earlier than is possible in the conventional engine, but also to the fact that a portion of the explosive mixture which has been drawn into the chamber upon the opening of the intake valve or the supplemental valve (Fig. 5) is later drawn into the cylinder along with the gases from the intake manifold as the piston proceeds further on its induction stroke. By reason of the earlier initial flow of gases in the manifold and the increased charge entering the cylinder, it will be apparent that the time required to obtain an increase in power when the throttle opening is increased, is considerably reduced. Obviously, therefore, a much faster acceleration is possible where a chamber such as disclosed herein is provided, and moreover, increased power at any constant speed is provided under full throttle operation. Also a slower idling speed of the engine is permitted as heretofore referred to.

In accordance with the patent statutes I have described what I now believe to be the best embodiments of my invention, but I do not wish to be understood thereby as limiting myself or the scope of the invention as many changes and modifications may be made therein without departing from the spirit of the invention; all such I aim to include in the scope of the appended claims.

What I claim is:

1. The method of charging a cylinder of an internal combustion engine, which includes utilizing the pressures produced in the admission manifold adjacent an intake valve by the increasing space occurring in the cylinder during the operation of an intake valve for causing, during a following similar operation of an intake valve, a flow of gases against an intake valve.

2. The method of charging the cylinders of a multiple cylinder internal combustion engine, which includes utilizing the pressures produced in the admission manifold adjacent one intake valve by the increasing space occurring in one cylinder during the operation of the intake valve for causing, during a following similar operation of the intake valve of another cylinder, a flow of gases against said last-mentioned valve.

3. In an internal combustion engine having a chamber and a cylinder and an admission manifold, a positively operated intake valve, said engine provided with a passageway for conveying an explosive charge from the admission manifold into the cylinder, a second passageway communicating with the said passageway through an aperture having varying areas, said aperture being adjacent the said intake valve.

4. In a multiple cylinder internal combustion engine having a manifold for conveying the fuel and air to the cylinders, intake and exhaust valves for each cylinder, said engine provided with a passageway communicating with each cylinder, an opening from said passageway into the cylinder, said opening being controlled by one of said intake valves, and a second passageway associated with two or more of said passageways and being so constructed and arranged that the operation of an intake valve will control communication with one of said first-mentioned passageways adjacent the said intake valve.

5. A multiple cylinder internal combustion engine including a head provided with a closed chamber adapted to communicate with a plurality of cylinders, an intake manifold and intake ports in said head, and pipes connecting said chamber and ports.

6. A multiple cylinder internal combustion engine including a head provided with a closed chamber adapted to communicate with a plurality of cylinders, an intake manifold and intake ports in said head, and a pipe in each of said ports coaxial therewith and communicating with said chamber.

7. A multiple cylinder internal combustion engine including a head provided with a plurality of closed chambers adapted to communicate with a plurality of cylinders, an intake manifold and intake ports in said head, and a pipe in each of said ports coaxial therewith and communicating with certain of said chambers.

8. A multiple cylinder internal combustion engine including a head provided with a pair of closed chambers adapted to communicate with a plurality of cylinders, an intake manifold and intake ports in said head, a pipe in each of said ports coaxial therewith, certain of said pipes communicating with one chamber and the remaining pipes communicating with the other chamber.

9. In a multiple cylinder internal combustion engine having positively operated intake valves and an admission manifold, a passage communicating with the admission manifold adjacent two or more of said intake valves through apertures having varying areas, said areas being controlled by the valves.

10. In a multiple cylinder internal combustion engine having positively operated intake valves, an intake port for each cylinder and an admission manifold, a passage for providing communication between the intake ports of two or more cylinders said passage communicating with the said admission manifold through apertures having varying areas, said areas being controlled by the valves.

11. A multiple cylinder internal combustion engine including a head provided with a closed chamber adapted to communicate with a plurality of cylinders, an intake manifold and intake ports in said head, and a pipe in each of said ports coaxial therewith and communicating with the intake manifold.

12. A multiple cylinder internal combustion engine including a head provided with a plurality of closed chambers adapted to communicate with a plurality of cylinders, an intake manifold and intake ports in said head, and a pipe in each of said ports coaxial therewith and communicating with the intake manifold.

13. A multiple cylinder internal combustion engine including a head provided with a pair of closed chambers adapted to communicate with a plurality of cylinders, an intake manifold and intake ports in said head, a pipe in each of said ports coaxial therewith forming an annular passage around each of said pipes, certain of said annular passages communicating with one chamber and the remaining annular passages communicating with the other chamber.

JOSEPH R. DAVIS.